US011525203B2

(12) United States Patent
Chi et al.

(10) Patent No.: US 11,525,203 B2
(45) Date of Patent: Dec. 13, 2022

(54) DECELERATING CLUTCH OF A WASHING MACHINE, AND WASHING MACHINE

(71) Applicant: QINGDAO HAIER DRUM WASHING MACHINE CO., LTD., Shandong (CN)

(72) Inventors: Zongrui Chi, Shandong (CN); Houli Luan, Shandong (CN)

(73) Assignees: QINGDAO HAIER LAUNDRY ELECTRIC APPLIANCES CO., LTD., Shandong (CN); HAIER SMART HOME CO., LTD., Shandong (CN)

( * ) Notice: Subject to any disclaimer, the term of this patent is extended or adjusted under 35 U.S.C. 154(b) by 534 days.

(21) Appl. No.: 16/494,051

(22) PCT Filed: Mar. 8, 2018

(86) PCT No.: PCT/CN2018/078401
§ 371 (c)(1),
(2) Date: Sep. 13, 2019

(87) PCT Pub. No.: WO2018/166397
PCT Pub. Date: Sep. 20, 2018

(65) Prior Publication Data
US 2021/0123179 A1    Apr. 29, 2021

(30) Foreign Application Priority Data
Mar. 14, 2017 (CN) .......................... 201710150399.5

(51) Int. Cl.
*D06F 37/40* (2006.01)
*D06F 23/04* (2006.01)
(Continued)

(52) U.S. Cl.
CPC .............. *D06F 37/40* (2013.01); *D06F 23/04* (2013.01); *D06F 37/36* (2013.01); *F16C 33/583* (2013.01); *F16C 3/02* (2013.01); *F16C 2314/00* (2013.01)

(58) Field of Classification Search
None
See application file for complete search history.

(56) References Cited

U.S. PATENT DOCUMENTS

2017/0002499 A1 *   1/2017   Lv .......................... D06F 17/08

FOREIGN PATENT DOCUMENTS

| CN | 1282132 A | 1/2001 |
|---|---|---|
| CN | 200992652 Y | 12/2007 |

(Continued)

OTHER PUBLICATIONS

CN 105063965 Espacenet translation , Novel clutch for roller washing machine, 2015 (Year: 2015).*

(Continued)

*Primary Examiner* — Cristi J Tate-Sims
(74) *Attorney, Agent, or Firm* — Buchanan, Ingersoll & Rooney PC

(57) ABSTRACT

A decelerating clutch of a washing machine includes a bearing seat, an input shaft, an output shaft, and an output shaft sleeve. The input shaft and the output shaft are coaxial, the output shaft sleeve is sleeved on the input shaft and the output shaft, the output shaft sleeve is installed on the bearing seat via a bearing, the output shaft sleeve is connected with the input shaft via a planetary gear train, two ends and a middle part of the output shaft sleeve are respectively provided with at least one bearing, an inner ring of the bearing is coordinated with the output shaft sleeve, and an outer ring is coordinated with the bearing seat. The decelerating clutch of a washing machine improves a capa- (Continued)

bility of an output shaft sleeve in resisting against a radial load, and further prolongs the service life of a decelerating clutch of a washing machine.

10 Claims, 4 Drawing Sheets

(51) Int. Cl.
*D06F 37/36* (2006.01)
*F16C 33/58* (2006.01)
*F16C 3/02* (2006.01)

(56) References Cited

FOREIGN PATENT DOCUMENTS

| CN | 101205677 A | 6/2008 |
| CN | 201089846 Y | 7/2008 |
| CN | 202380279 U | 8/2012 |
| CN | 202595505 U | 12/2012 |
| CN | 105063965 A | 11/2015 |
| CN | 204875241 U | 12/2015 |
| JP | H07299283 A | 11/1995 |
| JP | 2011200545 A | 10/2011 |
| KR | 101639023 B1 | 7/2016 |
| WO | 2015161579 A1 | 10/2015 |

OTHER PUBLICATIONS

International Search Report (PCT/ISA/210) dated May 30, 2018, by the Chinese Patent Office as the International Searching Authority for International Application No. PCT/CN2018/078401.
Office Action (Notice of Reasons for Refusal) dated Mar. 2, 2021, in corresponding Japanese Patent Application No. 2019-550684 and English translation of the Office Action. (4 pages).
Office Action dated Apr. 14, 2020, in corresponding Chinese Patent Application No. 201710150399.5. (4 pages).
Office Action dated Feb. 5, 2020, in corresponding European Patent Application No. 18768331.3. (3 pages).

* cited by examiner

DECELERATING CLUTCH OF A WASHING MACHINE, AND WASHING MACHINE

TECHNICAL FIELD

The present disclosure relates to laundry equipment, in particular to a decelerating clutch of a washing machine and a washing machine.

BACKGROUND ART

A decelerating clutch of an existing impeller-type washing machine is generally internally installed with two groups of bearings, which are respectively a front bearing arranged at one side of an inner barrel and a rear bearing arranged at one side of a motor, and the two bearings are jointly used for supporting an inner barrel shaft. A front end of a brake wheel is installed on an inner barrel shaft, and a rear end is fixed on an oil seal cover through a pressing rivet process. Through such a pressing rivet process, a greater axial load can be resisted after a brake wheel is connected with an oil seal cover; however, the capability in resisting against an axial load is small. During operation of a washing machine, due to shaking of an inner barrel, a greater radial load will be exerted on a connecting point between a brake wheel and an oil seal cover, and the greater radial load easily causes looseness at a connecting point between the brake wheel and the oil seal cover, and further, shaking of an inner barrel is expanded, and finally, the inner barrel is in friction with an outer barrel, and problems of big noise and big vibration arise.

In view of this, the present disclosure is hereby proposed.

SUMMARY

An object of the present disclosure is to overcome shortcomings of the prior art, and provide a decelerating clutch of a washing machine which has a long service life and can lower radial shaking of an inner barrel.

Another object of the present disclosure is to provide a washing machine which is configured with the above decelerating clutch of a washing machine.

In order to realize the first object, the present disclosure adopts the following technical solution:

A decelerating clutch of a washing machine includes a bearing seat, an input shaft, an output shaft, and an output shaft sleeve, wherein the input shaft and the output shaft are arranged coaxially, the output shaft sleeve is sleeved on the input shaft and the output shaft, the output shaft sleeve is installed on the bearing seat via a bearing, the output shaft sleeve is connected with the input shaft in a transmission manner via a planetary gear train, at least one bearing is arranged at two ends and a middle part of the output shaft sleeve, an inner ring of the bearing is coordinated with the output shaft sleeve, and an outer ring is coordinated with the bearing seat.

Further, the output shaft sleeve includes an inner barrel shaft, a brake wheel and an oil seal cover, wherein the inner barrel shaft and the oil seal cover are respectively arranged at two sides of the brake wheel and are fixedly connected with the brake wheel; and the bearing includes a first bearing installed on the inner barrel shaft, a second bearing installed on the brake wheel, and a third bearing installed on the oil seal cover.

Further, an inner ring of the second bearing is in clearance fit with an outer peripheral wall of the brake wheel, and an outer ring is in interference fit with an inner wall of the bearing seat. Through such a setting manner, tiny radial movement of a brake wheel is allowed, when the brake wheel heats up, a certain deformation space is reserved for the brake wheel, and meanwhile, assembly is facilitated.

Further, the bearing seat includes a first bearing seat and a second bearing seat, wherein the first bearing seat and the second bearing seat are fixedly connected to form a cavity for accommodating the output shaft and the output shaft sleeve, and the first bearing seat and the second bearing seat are respectively provided with a locating structure for locating bearings.

Further, the first bearing seat and the second bearing seat are provided with locating structures which are coordinated with each other, for jointly defining axial movement of the second bearing.

Further, a first locating surface and a second locating surface are arranged on the first bearing seat, a third locating surface and a fourth locating surface are arranged on the second bearing seat; the first locating surface is in location fit with the first bearing, the third locating surface is in location fit with the third bearing, and the second locating surface and the fourth locating surface are jointly in location fit with the second bearing.

Further, the second locating surface is in contact fit with one end face of an outer ring of the second bearing, and the fourth locating surface is in contact fit with another end face of the outer ring of the second bearing.

Further, the second locating surface is a step surface arranged on an inner wall of a first cavity of the first bearing seat, the fourth locating surface is an end face of the second bearing seat, an end part, on which the end face is located, of the second bearing seat, is inserted into the first cavity of the first bearing seat, and the end face is arranged in the first cavity of the first bearing seat and is arranged opposite to the second locating surface.

Further, the inner barrel shaft is a step shaft, and is provided with a step surface to be in location fit with the first bearing; the oil seal cover is clamped with a C-shaped check ring, and the C-shaped check ring is arranged at one side, far away from the inner barrel shaft, of a third bearing, and is in location fit with the third bearing.

In order to realize the second object, the present disclosure adopts the following technical solution:

A washing machine configured with the above decelerating clutch of a washing machine is provided.

After the technical solutions of the present disclosure are adopted, the following beneficial effects are brought about:

As to a decelerating clutch of a washing machine in the present disclosure, a bearing is added between the existing front bearing and rear bearing, and the added bearing is configured to support a middle part of an output shaft sleeve, thereby improving a capability of an output shaft sleeve in resisting against a radial load, enabling a connecting point between a brake wheel and an oil seal cover to be subjected to a decreased force, avoiding looseness or cracking of a connecting point between a brake wheel and an oil seal cover, lowering shaking amplitude during operation of an inner barrel, and avoiding collision between an inner barrel and an outer barrel in a rotating process of an inner barrel, therefore, the service life is longer, and the maintenance cost is lowered. During operation of a washing machine of the present disclosure, the noise is low, and the user experience is better.

Figure 1:
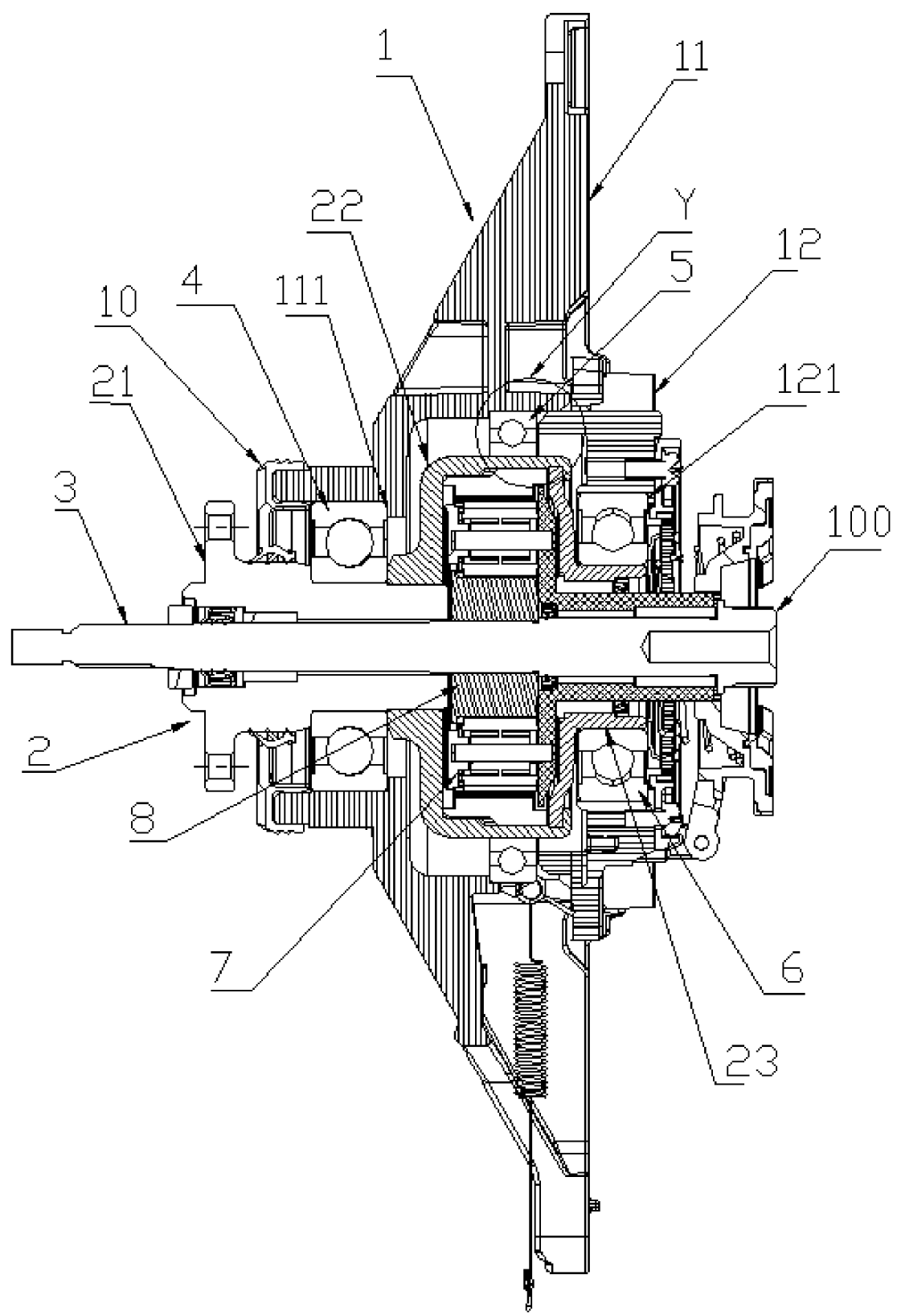
FIG. 1 is a structural sectional view of embodiment 1 of the present disclosure.

Reference numerals in the figures: 1, bearing seat; 2, output shaft sleeve; 3, output shaft; 4, first bearing; 5, second bearing; 6, third bearing; 7, planet gear; 8, sun gear; 9, C-shaped check ring; 10, big oil seal; 11, first bearing seat; 12, second bearing seat; 21, inner barrel shaft; 22, brake wheel; 23, oil seal cover; 100, input shaft; 111, first locating surface; 112, second locating surface; 121, third locating surface; 122, fourth locating surface.

DETAILED DESCRIPTION OF THE EMBODIMENTS

A further detailed description will be given below on specific embodiments of the present disclosure in combination with accompanying drawings.

Embodiment 1

Figure 2:
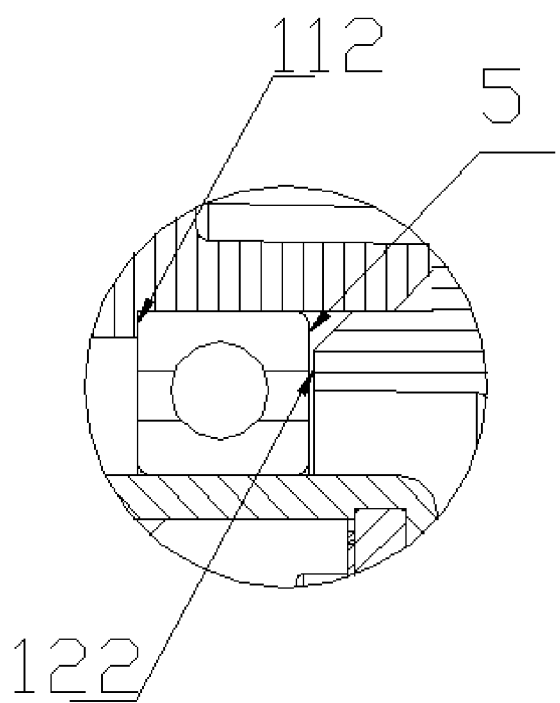
FIG. 2 is a partial enlarged view of Y of FIG. 1.

As shown in FIG. 1 and FIG. 2, a decelerating clutch of a washing machine includes a bearing seat 1, an input shaft 100, an output shaft 3, and an output shaft sleeve 2, wherein the input shaft 100 and the output shaft 3 are arranged coaxially, the output shaft sleeve 2 is sleeved on the input shaft 100 and the output shaft 3, the output shaft sleeve 2 can rotate relative to the input shaft 100, and the output shaft sleeve 2 is connected with the input shaft 100 in a transmission manner via a planetary gear train. Preferably, the input shaft 100 and the output shaft 3 are configured to a through-shaft, and they are of an integrated structure. The input shaft 100 is connected with a motor shaft, the output shaft 3 is connected with an impeller in an inner barrel, and the output shaft sleeve 2 is connected with an inner barrel to drive rotation of an inner barrel. The output shaft sleeve 2 is installed on a bearing seat 1 via a bearing, and can rotate relative to the bearing seat 1, and the bearing seat 1 is configured to support the output shaft sleeve 2. At least one bearing is respectively arranged at two ends and a middle part of the output shaft sleeve 2, to form a three-point support, such that two ends and the middle part of the output shaft sleeve 2 are supported, and an inner ring of the bearing is coordinated with the output shaft sleeve 2, and an outer ring is coordinated with a bearing seat.

Specifically, the output shaft sleeve 2 includes an inner barrel shaft 21, a brake wheel 22 and an oil seal cover 23, wherein the inner barrel shaft 21 and the oil seal cover 23 are respectively arranged at two sides of the brake wheel 22, and are fixedly connected with the brake wheel 22, and the three moves synchronously. Specifically, the inner barrel shaft 21 and the brake wheel 22 are connected in an inserting manner, and are in interference fit, and the oil seal cover 23 is in riveted connection with the brake wheel 22. The inner barrel shaft 21 is fixedly connected with an inner barrel, a planetary gear train is set within a brake wheel 22, and includes a sun gear 8 which is fixedly installed on an input shaft 100 and a planet gear 7 which is meshed with the sun gear 8 and installed on a planet carrier, teeth matched with the planet gear 7 are arranged on an inner wall of the brake wheel 22, or an outer tooth ring is fixedly arranged within the brake wheel 22, an inner side of the outer tooth ring is meshed with the planet gear 7, and the brake wheel 22 can be driven to rotate through the planet gear 7 when the sun gear 8 rotates.

The bearing includes: a first bearing 4 installed on the inner barrel shaft 21, a second bearing shaft 5 installed on a brake wheel 22, and the third bearing 6 installed on an oil seal cover 23. An inner ring of the first bearing 4 and the third bearing 6 is respectively in interference fit with the inner barrel shaft 21 and the oil seal cover 23, and an outer ring is respectively in interference fit or clearance fit with the bearing seat 1. Since the brake wheel 22 and the oil seal cover 23 are simultaneously supported by a bearing, when the brake wheel 22 and the oil seal cover 23 are subjected to a radial load, the pressure is absorbed by the bearing, thereby preventing pressure from concentrating on a connecting point between the brake wheel 22 and the oil seal cover 23, since concentrated pressure may cause cracking at a connecting point between the brake wheel 22 and the oil seal cover 23.

The inner barrel shaft 21 is a step shaft, and is provided with a step surface to be in location fit with the first bearing 4; an inner ring of the second bearing 5 is in clearance fit with an outer peripheral wall of the brake wheel 22, and an outer ring is in interference fit with an inner wall of the bearing seat 1. Through such a setting manner, tiny radial movement of the brake wheel 22 is allowed, when the brake wheel 22 heats up, a certain deformation space is reserved for the brake wheel 22, and meanwhile, assembly is facilitated.

The bearing seat 1 includes a first bearing seat 11 and a second bearing seat 12, wherein the first bearing seat 11 is installed on an outer barrel, the first bearing seat 11 and the second bearing seat 12 are fixedly connected to form a mold cavity for accommodating the output shaft 3 and the output shaft sleeve 2, the brake wheel 22 is arranged inside the mold cavity, and the first bearing seat 11 and the second bearing seat 12 are respectively provided with a locating structure for locating bearings. Wherein the first bearing 4 and the third bearing 6 are respectively separately located through the first bearing seat 11 and the second bearing seat 12, and the second bearing 5 is jointly located through locating structures which are coordinated with each other and which are arranged on the first bearing seat 11 and the second bearing seat 12.

Specifically, the first bearing seat 11 is provided with a first locating surface 111 and a second locating surface 112, and the second bearing seat 12 is provided with a third locating surface 121 and a fourth locating surface 122; the first locating surface 111 is in location fit with the first bearing 4, to limit movement of the first bearing 4 towards one side of a motor; the third locating surface 121 is in location fit with the third bearing 6, to limit movement of the third bearing 6 towards one side of a motor. The second locating surface 112 and the fourth locating surface 122 are jointly in location fit with the second bearing 5, the second locating surface 112 is in contact fit with one end face of an outer ring of the second bearing 5, to limit movement of the second bearing 5 towards one side of an inner barrel, and the fourth locating surface 122 is in contact fit with another end face of the outer ring of the second bearing 5, to limit movement of the second bearing 5 towards one side of a motor.

Preferably, the first locating surface 111 and the second locating surface 112 are step surfaces which are arranged on an inner wall of a first cavity of the first bearing seat 11, the third locating surface 121 is a step surface which is arranged on the second bearing seat 12, the fourth locating surface 122 is an end face of the second bearing seat 12, and an end part, on which the end face is located, of the second bearing seat 12, is inserted into the first cavity of the first bearing seat 11, such that the end face is arranged in the first cavity of a first bearing seat 11, and is arranged relative to the second locating surface 112.

Preferably, a tiny gap is reserved between an end face of the second bearing 5 and the fourth locating surface 122, to allow tiny axial movement of the second bearing 5.

A big oil seal 10 is further arranged between the inner barrel shaft 21 and the first bearing seat 11, an end cover is further arranged between the output shaft 3 and the second bearing seat 12, and a mold cavity which is formed between the first bearing seat 11 and the second bearing seat 12 is sealed, to prevent dust from entering the mold cavity.

Embodiment 2

Figure 3:
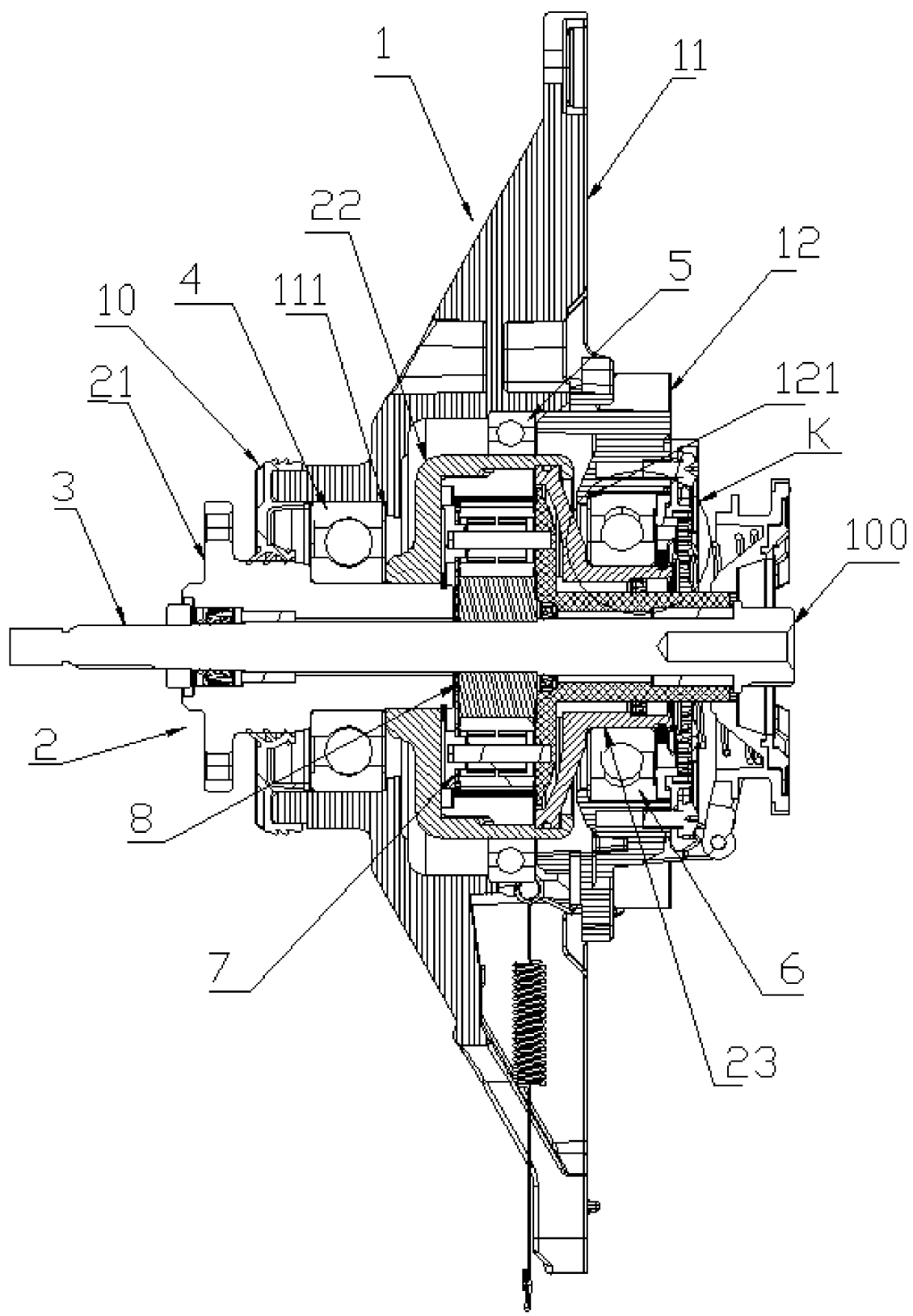
FIG. 3 is a structural sectional view of embodiment 2 of the present disclosure.
Figure 4:
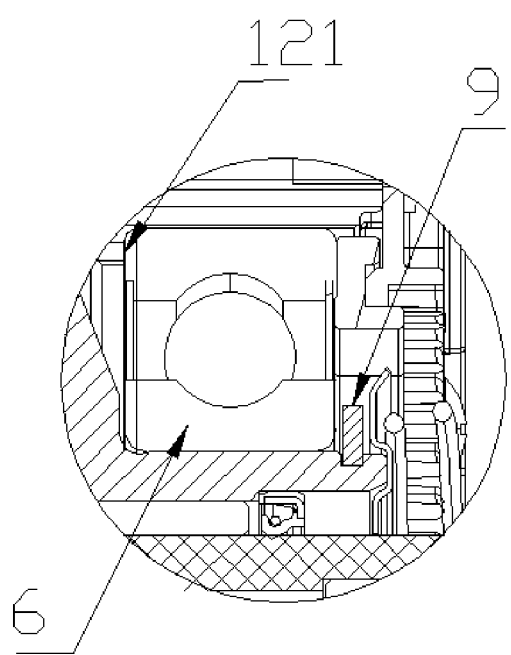
FIG. 4 is a partial enlarged view of K of FIG. 3.

In embodiment 1, the output shaft sleeve 2 is not completely axially limited; therefore, the output shaft sleeve 2 may be enabled to move towards one side of an inner barrel. In combination with FIG. 3 and FIG. 4, the present embodiment differs from embodiment 1 as follows: the third locating surface 121 is arranged at one side, close to the brake wheel 22, of the third bearing 6, and limits movement of the third bearing 6 towards one side of an inner barrel. The oil seal cover 23 is clamped with a C-shaped check ring 9, and the C-shaped check ring 9 is arranged at another side of the third bearing 6 and is in location fit with the third bearing 6, to limit movement of the output shaft sleeve 2 towards one side of an inner barrel. When the output shaft sleeve 2 moves towards one side of a motor, the output shaft sleeve 2 will be limited by the first locating surface 111 on the first bearing seat 11, and when the output shaft sleeve 2 moves towards one side of an inner barrel, the output shaft sleeve 2 will be limited by the third locating surface 121 on the second bearing seat 12, such that the output shaft sleeve 2 is completely axially limited, thereby avoiding axial movement.

Those skilled in the art should also understand that, such terms as "left" and "right" used in embodiments of the present disclosure for indicating orientation or positional relationship are based on the status of accompanying drawings, and these terms are merely for the convenience of description and understanding of technical solutions of the present disclosure, rather than for indicating or implying that the device or element referred to must be located in a certain orientation or must be constructed or operated in a certain orientation, therefore the terms cannot be understood as a limitation to the present disclosure.

What is described above is embodiments of the present disclosure. It should be noted that, for those skilled in the art, under a premise of not departing from principles of the present disclosure, various transformations and improvements can also be made, and such transformations and improvements shall also be deemed to fall within the protection scope of the present disclosure.

The invention claimed is:

1. A decelerating clutch of a washing machine, comprising:
   a bearing seat;
   an input shaft;
   an output shaft; and
   an output shaft sleeve, wherein,
   the input shaft and the output shaft are arranged coaxially, the output shaft sleeve is sleeved on the input shaft and the output shaft,
   the output shaft sleeve is installed on the bearing seat via a bearing, the output shaft sleeve is connected with the input shaft in a transmission manner via a planetary gear train,
   two ends and a middle part of the output shaft sleeve are respectively provided with at least one bearing,
   an inner ring of the bearing is coordinated with the output shaft sleeve, and an outer ring is coordinated with the bearing seat;
   the output shaft sleeve includes an inner barrel shaft, a brake wheel and an oil seal cover,
   the inner barrel shaft and the oil seal cover are respectively arranged at two sides of the brake wheel and are fixedly connected with the brake wheel, and
   a first bearing is installed on the inner barrel shaft, a second bearing is installed on the brake wheel, and a third bearing is installed on the oil seal cover.

2. The decelerating clutch of a washing machine of claim 1, wherein an inner ring of the second bearing is in clearance fit with an outer peripheral wall of the brake wheel, and an outer ring is in interference fit with an inner wall of the bearing seat.

3. The decelerating clutch of a washing machine of claim 1, wherein the bearing seat comprises a first bearing seat and a second bearing seat,
   the first bearing seat and the second bearing seat are fixedly connected to form a cavity for accommodating the output shaft and the output shaft sleeve, and
   the first bearing seat and the second bearing seat are respectively provided with a locating structure for locating bearings.

4. The decelerating clutch of a washing machine of claim 3, wherein the locating structure of the first bearing seat is coordinated with the locating structure of the second bearing for jointly defining axial movement of the second bearing.

5. The decelerating clutch of a washing machine of claim 3, wherein a first locating surface and a second locating surface are arranged on the first bearing seat,
   a third locating surface and a fourth locating surface are arranged on the second bearing seat;
   the first locating surface is in fit with the first bearing to locate the first bearing, the third locating surface is in fit with the third bearing to locate the third bearing, and the second locating surface and the fourth locating surface are jointly in fit with the second bearing to locate the second bearing.

6. The decelerating clutch of a washing machine of claim 5, wherein the second locating surface is in contact fit with one end face of an outer ring of the second bearing, and the fourth locating surface is in contact fit with another end face of the outer ring of the second bearing.

7. The decelerating clutch of a washing machine of claim 6, wherein the second locating surface is a step surface arranged on an inner wall of a first cavity of the first bearing seat,
   the fourth locating surface is an end face of the second bearing seat,
   an end part, on which the end face is located, of the second bearing seat, is inserted into the first cavity of the first bearing seat, and
   the end face is arranged in the first cavity of the first bearing seat and is arranged opposite to the second locating surface.

8. The decelerating clutch of a washing machine of claim 1, wherein the inner barrel shaft is a step shaft, and is provided with a step surface to be in fit with the first bearing to locate the first bearing, the oil seal cover is clamped with a C-shaped check ring, and the C-shaped check ring is arranged at one side, far away from the inner barrel shaft, of a third bearing, and is in fit with the third bearing to locate the third bearing.

9. A washing machine configured with the decelerating clutch of a washing machine of claim 1.

10. The decelerating clutch of a washing machine of claim 2, wherein the bearing seat comprises a first bearing seat and a second bearing seat, the first bearing seat and the second bearing seat are fixedly connected to form a cavity for accommodating the output shaft and the output shaft sleeve, and the first bearing seat and the second bearing seat are respectively provided with a locating structure for locating bearings.

\* \* \* \* \*